United States Patent [19]
Weisenburger

[11] Patent Number: 5,988,405
[45] Date of Patent: Nov. 23, 1999

[54] WALL UNIT FOR DISPLAYING THE COVERS OF MULTIPLE MEDIA CASES

[75] Inventor: Guy D. Weisenburger, Rancho Palos Verdes, Calif.

[73] Assignee: Smart Guy, Inc., Provo, Utah

[21] Appl. No.: 09/118,153

[22] Filed: Jul. 17, 1998

[51] Int. Cl.[6] .................................................. A47F 7/00
[52] U.S. Cl. .......................... 211/40; 211/41.12; 40/124.4
[58] Field of Search .................................. 211/40, 41.12, 211/88.01; 40/124, 124.4

[56] References Cited

U.S. PATENT DOCUMENTS

| | | | |
|---|---|---|---|
| 4,919,287 | 4/1990 | Haskett et al. | 211/40 |
| 4,940,147 | 7/1990 | Hunt | 211/40 |
| 5,040,687 | 8/1991 | Whittington | 211/40 |
| 5,232,089 | 8/1993 | Kim | 211/40 X |
| 5,415,296 | 5/1995 | Wright | 211/40 |
| 5,419,062 | 5/1995 | Polinski et al. | 40/124.4 |
| 5,462,177 | 10/1995 | O'Donnell | 211/40 |
| 5,603,415 | 2/1997 | Balnis | 211/40 |
| 5,769,244 | 6/1998 | Wyatt | 211/40 |

*Primary Examiner*—Robert W. Gibson, Jr.

[57] ABSTRACT

A wall display unit has multiple compartments for displaying the covers of multiple media cases. The wall unit includes a flat planer panel, a plurality of vertically-spaced horizontal partitions integral with the panel, a plurality of horizontally-spaced vertical partitions integral with the panel and intersecting the horizontal partitions, the horizontal and vertical partitions being spaced to form multiple compartments on one surface of the panel for containing the media cases disposed parallel to the panel so that the covers of the cases are displayed. Preferably the compartments are each evenly spaced and have the same size as the periphery of a media case to receive the case in a pressure fit about the periphery of the case. The display rack also preferably includes a notch in one of the partition members for exposing at least a portion of the edge of each media case for easy access to remove the case.

19 Claims, 3 Drawing Sheets

WALL UNIT FOR DISPLAYING THE COVERS OF MULTIPLE MEDIA CASES

BACKGROUND

1. Field of the Invention

The present invention is related to a wall display unit. More particularly, the present invention concerns a wall unit for displaying the covers of multiple media cases in adjacent compartments on the surface of the wall unit.

2. Technical Background

Media cases such as compact discs, audio tapes and video tapes typically are packaged and sold in plastic containers with colorful covers. In particular, the covers of compact discs and digital video discs often display interesting patterns, colors, people, figures and materials.

Many media cases are stored in a compact manner in which the cases are stacked so that the covers are hidden from view and only the spines are seen. Such storage units are provided primarily for the purpose of compactly stacking or arranging the media cases without concern for displaying the decorative covers. Moreover, such displays make it somewhat difficult to locate and access a desired media case.

Examples of this type of storage unit are shown in U.S. Pat. Nos. 5,297,675 (Martucci) and 5,553,720 (Dardashti). In the Martucci patent an elongated tray is provided for storing audio or video cassettes so that only the end or spine is showing. The Dardashti patent arranges cassettes in an ornamental configuration, such as a guitar, with only an edge or spine visible.

U.S. Pat. No. 5,570,781 (Bond) provides a container for supporting a plurality of discs at a slant so that the covers are partially showing. Although the configurations of the Bond patent enables partial visibility of the case covers, the arrangement does not provide a full display of the covers for artistic purposes nor does the unit form a planar surface for readily displaying the media case covers on the wall.

Consequently a display case is needed for displaying the covers of media cases to enable locating and accessing a desired media case. A display case is also needed for utilizing available wall space to free up shelf storage space. Moreover, a display case is desirable which will display a plurality of media cases in a colorful and interesting montage. Means are also desired to facilitate maintaining the media cases in the display unit and for removing and/or interchanging the media cases in the display unit. A display unit having these and other desirable features is disclosed and claimed in the following description.

BRIEF SUMMARY OF INVENTION

The present invention is directed to a novel wall display unit which has multiple compartments for displaying multiple media cases. The display unit enables easy exchanging of media covers to alter the appearance of the display unit at will. The wall unit includes a flat planer panel, a plurality of vertically-spaced horizontal partitions integral with the panel, a plurality of horizontally-spaced vertical partitions integral with the panel and intersecting the horizontal partitions, the horizontal and vertical partitions being spaced to form multiple compartments on one surface of the panel for containing the media cases disposed parallel to the panel so that the covers of the cases are displayed. In one embodiment of the present invention, a display rack comprises a single integral structure having a flat elongated panel, a first plurality of elongated partition members disposed on the face of the panel and spaced from each other, the second plurality of elongated partition members disposed on the face of the panel and spaced from each other, a second plurality of elongated partition members being spaced evenly on the surface of the panel spaced from each other and disposed perpendicular to the first plurality of partition members.

The first and second plurality of partition members form a plurality of rectangular compartments on the surface of the panel, the compartments each being sized to receive one of the media cases disposed parallel to the panel to display the covers of the media cases. Preferably the compartments are each evenly spaced and have the same size as the periphery of a media case to receive the case in a pressure fit about the periphery of the case. The display rack also preferably includes a notch in one of the partition members for exposing at least a portion of the edge of each media case for easy access to remove the case and exchange it for another one.

These and other advantages of the present invention will become more fully apparent by examination of the following description of the preferred embodiments and the accompanying drawings.

BRIEF DESCRIPTION OF THE DRAWINGS

To better understand the invention, a more particular description of the invention is rendered by reference to the appended drawings. These drawings only provide information concerning typical embodiments of the invention and are not to be considered limiting of the scope of the invention. Reference is made to the drawings in which.

DETAILED DESCRIPTION OF THE PREFERRED EMBODIMENTS

Figure 1:
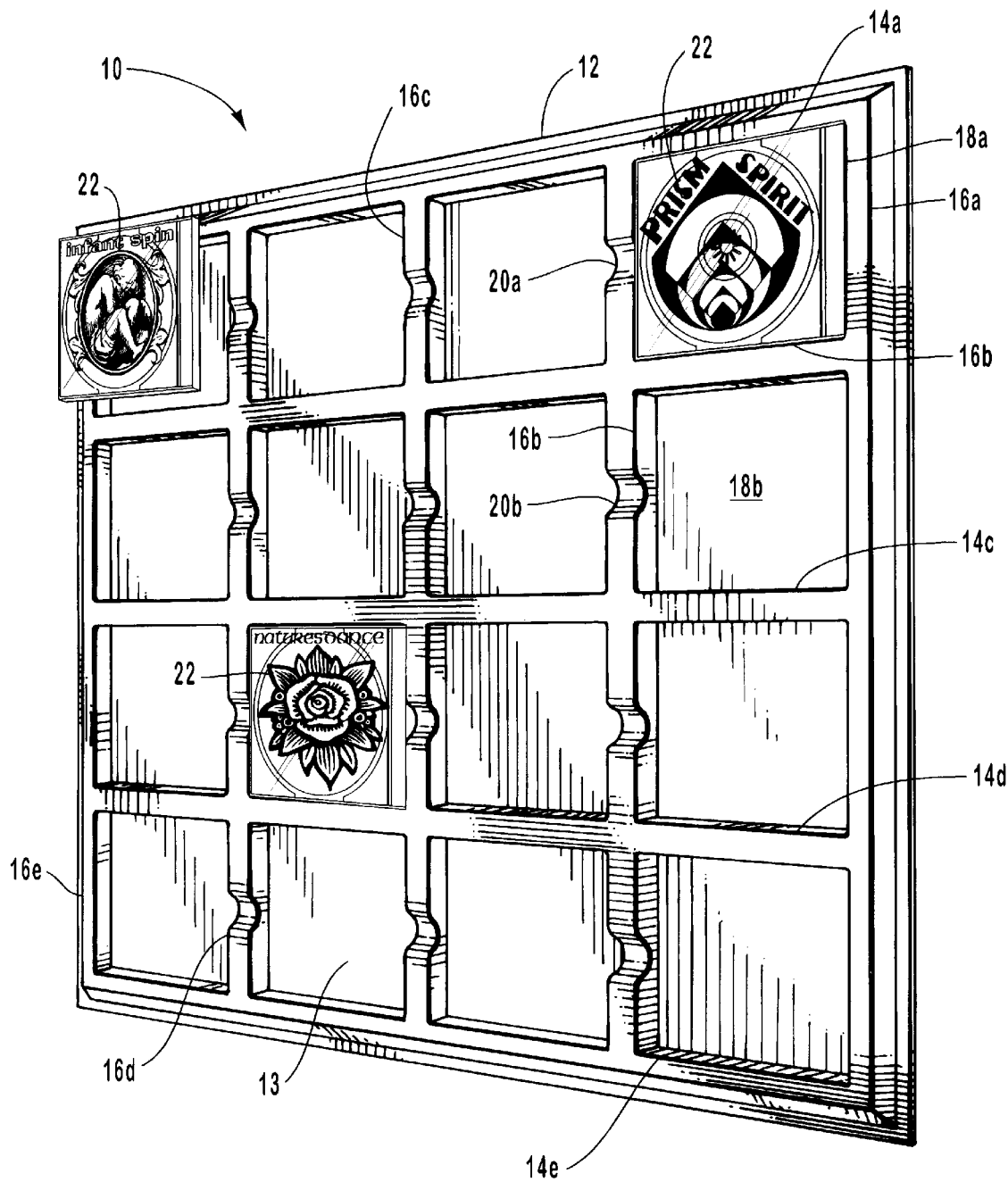
FIG. 1 is a perspective view of a preferred embodiment of the wall display unit showing a media case positioned in one of the compartments of the unit.

Reference is now made to the figures where the parts of the preferred embodiment are each referred to by numerals as shown. With particular reference to FIG. 1, a wall display unit according to the present invention is generally designated as 10. Unit 10 includes a flat rectangular panel 12 and a first plurality of partitioned members 14a, b, c, d and e each being disposed horizontal with two parallel edges of the panel 12 and are being spaced from each other evenly across the face 13 of panel 12.

A second plurality of partition members 16a, b, c, d and e run parallel to the other two sides of the planer member 12 and are spaced evenly horizontally across the face 13 of member 12. Partition members 16a, b, c , d and e intersect partition members 16a, b, c, d and e to form 16 rectangular compartments such as 18a and 18b. Each compartment is closed at the back face by panel 12 and is open at its front face. Each vertical partition member 16a, b, c, d and e includes a notch such as shown in 20a and 20b approximately midway along the side of compartments of 18a and 18b respectively. Each notch is preferably semicircular and at least large enough for an average index finger to have access to the contents of the compartment.

A media case 22 is positioned within compartment 18a as shown. Preferably the size of compartment 18a is sized so as to form a shape having the same size and shape as the periphery of the media case 22 so that the media case is positioned and held in place in a pressure fit by the edges of compartment 18a.

Media case 22 is positioned so as to display its cover outward from the display unit. Preferably 15 other media cases are positioned in each of the 15 compartments with their covers displayed outward and being positioned and held in each compartment by pressure fit around the periphery of each case. The result is an interesting and colorful display or montage showing 16 different media display cases.

Each of the media cases may be accessed through a notch in one of the partition members such as notch 20a which provides access to the edge of media case 22. Thereby the media cases are easily removed and exchanged with other media cases to alter the display at will.

Figure 2:
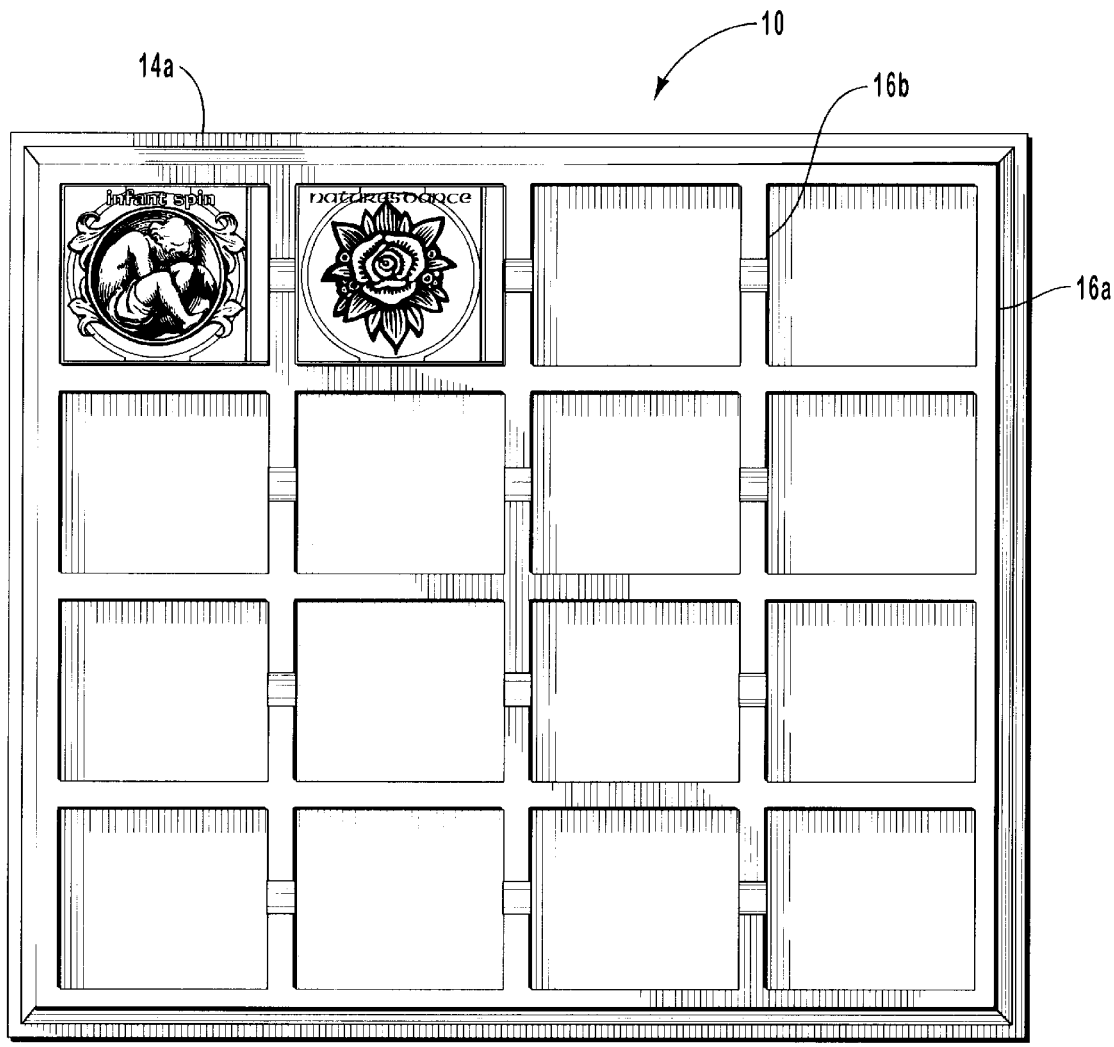
FIG. 2 is a planer view of the display unit of the present invention of FIG. 1.

FIG. 2 shows a planer view of media case 10. It can be readily seen that each of the vertical partition members 16a, b, c d and e are evenly spaced from each other. Likewise each of the horizontal 14a, b, c are evenly spaced vertically from each other.

Figure 3:
FIG. 3 is a side view of the display unit of FIG. 1.
Figure 4:
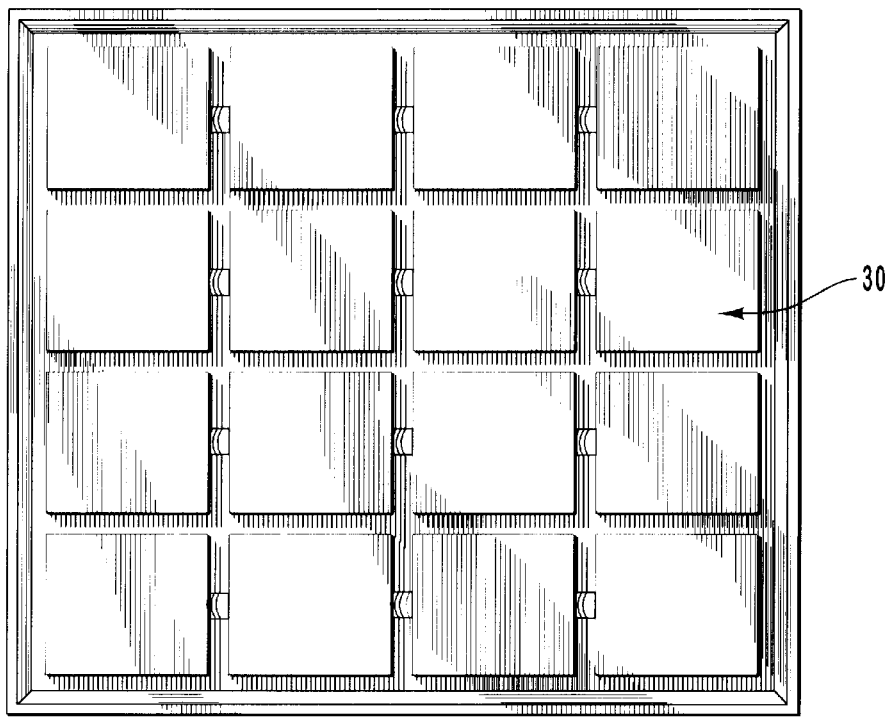
FIG. 4 is a back view of the display unit of FIG. 1.

FIG. 3 is a side view of the embodiment shown in FIG. 1. FIG. 4 is a back view showing the back 30 of display unit 10. The unit 10 is preferably vacuum molded, so that the back is a reverse image of the front 12 of unit 10.

Figure 5:
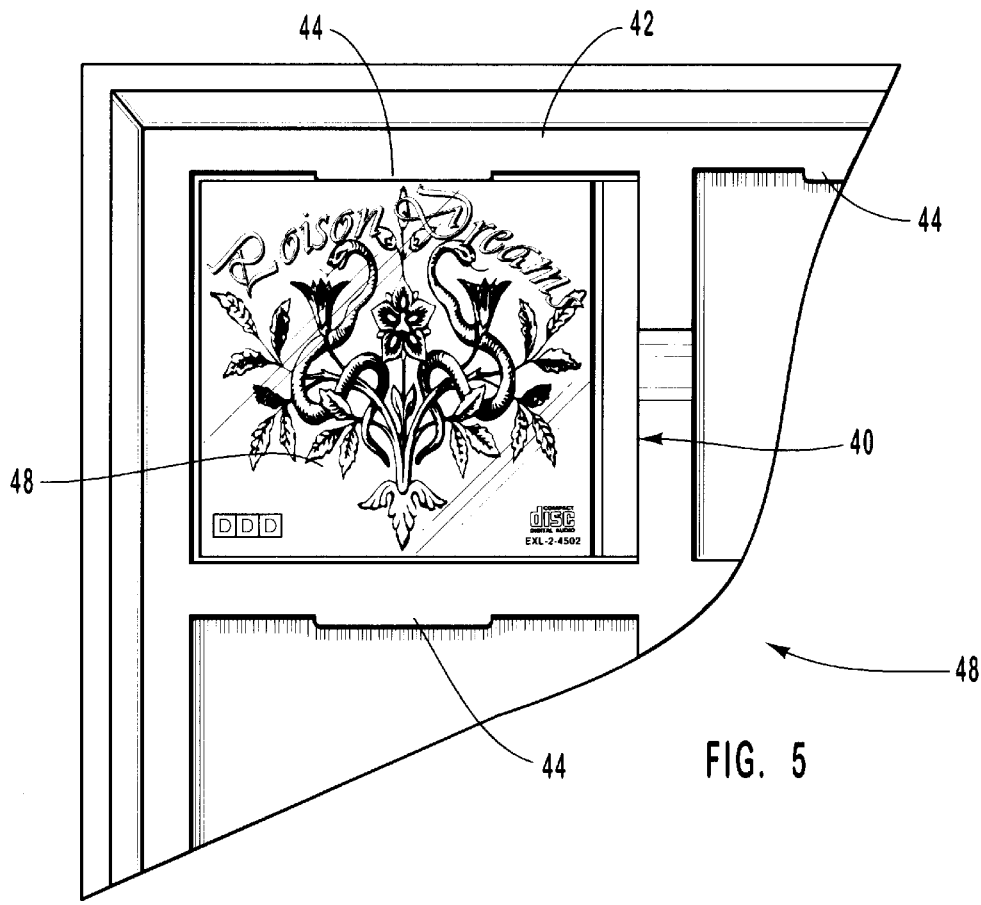
FIG. 5 is a partial planar view showing one compartment of an alternate embodiment of the present invention.

FIG. 5 shows an alternate preferred embodiment of the present invention. A single compartment 40 is shown. However, it is understood that there are other similar compartments on the panel 48 of the display unit, as in the embodiment of FIG. 1. One side 42 of the compartment walls includes a flexible rib, tab or finger 44 which functions to hold the media case 46 in the compartment 40. As the media case is pressed into the compartment 40, the rib or tab 44 flexes backward into the compartment to admit the case 46. When the side of case 46 clears the rib 44, the partition springs back in front of case 46 to hold it in place within the compartment 40.

It is understood that it is within the scope of the invention to employ other means to retain the case in place within the compartment.

Although wall display unit 10 is preferably vacuum molded, it may be made by other means such as injection molding. Likewise although unit 10 is preferably made of thin extruded sheet plastic or other light-weight plastic, it may be made of wood, metal or any other material which lends itself to manufacturing the unit. Unit 10 may also be made of any color or combination of colors of materials.

In one preferred embodiment, unit 10 is approximately 23 by 26 inches and about ¾ inch thick. Although the present invention shows 16 evenly-sized compartments, it is understood that the unit may have any number of compartments and the compartments may be of varying sizes and shapes to accommodate a variety of different sized and shaped media cases. It should also be understood that the media cases may be compact discs, audio tapes, video tapes, software discs and digital video discs (DVD), as well as any other type of media case.

It will also be understood and appreciated that the wall unit of the present invention provides an easy way to locate and access a particular media case, since the cover of each case is clearly displayed. Moreover, a multiple number of wall units may be hung on a wall, effectively covering the wall.

It should be appreciated that the apparatus of the present invention is capable of being incorporated in the form of a variety of other embodiments, only two of which have been illustrated and described above. The invention may be embodied in other forms without departing from its spirit or essential characteristics. The described embodiments are to be considered in all respects only as illustrative and not restrictive, and the scope of the invention is indicated by the appended claims rather than by the foregoing description. All changes which come within the meaning and range of equivalency of the claims are to be embraced within their scope.

What is claimed and desired to be secured by United States Letters Patent is:

1. A wall unit for displaying multiple media cases in multiple adjacent compartments comprising:
    a flat planer panel,
    a plurality of vertically-spaced horizontal partitions integral with the panel,
    a plurality of horizontally-spaced vertical partitions integral with the panel and intersecting the horizontal partitions,
    the horizontal and vertical partitions forming multiple compartments on one surface of the panel for containing said media cases disposed parallel to the panel, so that the covers of the cases are displayed, wherein at least one of the compartments are sized so that the partitions provide a pressure fit around the periphery of a media case placed in the compartment.

2. The wall unit of claim 1 wherein the horizontal and vertical partitions are evenly spaced to form uniformly-sized compartments.

3. The wall unit of claim 1 and further including a notch in one partition forming a part of one of the compartments to expose part of one side of a media case to enable removing the case from the compartment.

4. The wall unit of claim 1 wherein the panel is rectangular and the horizontal and vertical partitions from multiple compartments are each sized to receive a media case in a pressure fit.

5. The wall unit of claim 1 wherein the compartment is sized to receive and retain in a form fit at least one compact disc case with the cover displayed.

6. The wall unit of claim 1 wherein the compartment is sized to receive and retain in a form fit at least one video tape case with the cover displayed.

7. The wall unit of claim 1 wherein the compartment is sized to receive and retain in a form fit at least one audio tape case with the cover displayed.

8. The wall unit of claim 1 wherein the compartment is sized to receive and retain in a form fit at least one digital video disc case with the cover displayed.

9. The wall unit of claim 1 wherein the panel and partitions are vacuum-molded in a single integral structure.

10. The wall unit of claim 1 wherein the panel and partitions are injection-molded in a single integral structure.

11. The wall unit of claim 1 and further including a flexible member extending from a side of each compartment partially into the compartment, the flexible member being sufficiently flexible to flex inward within the compartment to admit the media case and then to spring back in front of the media case after the case clears the flexible member to thereby retain the media case within the compartment.

12. A display rack for supporting and displaying the covers of media cases in multiple compartments, comprising:
    a flat elongated panel,
    a first plurality of elongated partition members disposed on one face of the panel and spaced from each other, a second plurality of elongated partition members spaced evenly on the surface of the panel and spaced from each other and disposed perpendicular to the first plurality of partition members, wherein the first and second plurality of partition members form a plurality of rectangular compartments on the surface of the panel, the rectangular compartments each being sized to receive at least one of the media cases disposed parallel to the panel to display the cover of the media case, wherein the compartments have a periphery to fit the periphery of a media case so as to receive the case in a pressure fit about the periphery of the case.

13. The display rack unit of claim 13 wherein one of the sides of each of the compartments includes a notch therein.

14. The display rack of claim 13 wherein the partition members are spaced to form multiple evenly-sized compartments.

15. The display rack unit of claim 14 wherein one of the sides of each of the compartments includes a notch therein.

16. The display rack of claim 12 and further comprising a flexible rib in one of the walls of each compartment, the flexible rib being sufficiently flexible to flex inward within the compartment to admit the media case and then to spring back in front of the media case after the case clears the flexible rib to thereby retain the media case in position within the compartment.

17. A display rack forming an integral structure for containing and displaying a plurality of media cases in a common planar surface, comprising:

a substantially flat panel forming a flat planar surface, a plurality of compartments on the panel having walls extending perpendicular from the panel, the walls of each compartment forming a rectangle to receive a media case and to hold the case in a pressure fit in a common plane with the media cases in the other compartments, the common plane being parallel with the flat planar surface, wherein each of the evenly-sized compartments has a periphery to fit the periphery of a media case so as to receive the case in a pressure fit about the periphery of the case.

18. A display rack forming an integral structure for containing and displaying a plurality of media cases in a common planar surface, comprising:

a substantially flat panel forming a flat planar surface, a plurality of compartments on the panel having walls extending perpendicular from the panel, the walls of each compartment forming a rectangle to receive a media case and to hold the case in a common plane with the media cases in the other compartments, the common plane being parallel with the flat planar surface, and a flexible member extending from a side of each compartment partially into the compartment, the flexible member being sufficiently flexible to flex inward within the compartment to admit the media case and then to spring back in front of the media case after the case clears the flexible member to thereby retain the media case within the compartment.

19. The display rack of claim 18 wherein the edges of the compartment provide a pressure fit about the periphery of the media case to retain the media case within the compartment.

* * * * *